United States Patent
Kindle et al.

(10) Patent No.: US 9,508,133 B2
(45) Date of Patent: Nov. 29, 2016

(54) SYSTEM AND METHOD FOR GENERATING AN IMAGE RESULT BASED ON AVAILABILITY OF A NETWORK RESOURCE

(71) Applicant: Duelight LLC, Sunnyvale, CA (US)

(72) Inventors: Brian Kindle, Sunnyvale, CA (US); Adam Feder, Mountain View, CA (US); William Rivard, Menlo Park, CA (US)

(73) Assignee: Duelight LLC, Sunnyvale, CA (US)

( * ) Notice: Subject to any disclaimer, the term of this patent is extended or adjusted under 35 U.S.C. 154(b) by 26 days.

(21) Appl. No.: 14/547,074

(22) Filed: Nov. 18, 2014

(65) Prior Publication Data

US 2016/0140702 A1    May 19, 2016

(51) Int. Cl.
  *G06K 9/54* (2006.01)
  *G06T 5/00* (2006.01)
  *H04N 1/00* (2006.01)
  *H04N 5/232* (2006.01)

(52) U.S. Cl.
  CPC .............. *G06T 5/009* (2013.01); *G06T 5/002* (2013.01); *G06T 5/003* (2013.01); *H04N 1/00244* (2013.01); *H04N 5/23216* (2013.01); *H04N 5/23293* (2013.01); *G06T 2207/20208* (2013.01)

(58) Field of Classification Search
  None
  See application file for complete search history.

(56) References Cited

U.S. PATENT DOCUMENTS

| | | |
|---|---|---|
| 6,778,948 B1 | 8/2004 | Kanetaka et al. |
| 7,750,913 B1 | 7/2010 | Parenteau et al. |
| 8,797,337 B1 | 8/2014 | Labour et al. |
| 8,878,963 B2 | 11/2014 | Prabhudesai et al. |
| 8,988,559 B2 | 3/2015 | Chao et al. |
| 9,083,935 B2 | 7/2015 | Demandolx et al. |
| 9,218,662 B1 | 12/2015 | Feder et al. |
| 9,361,319 B2 | 6/2016 | Feder et al. |
| 9,448,771 B2 | 9/2016 | Feder et al. |
| 9,460,118 B2 | 10/2016 | Feder et al. |
| 9,460,125 B2 | 10/2016 | Feder et al. |
| 2001/0009437 A1* | 7/2001 | Klein ............... H04N 1/00307 348/207.99 |
| 2001/0033284 A1 | 10/2001 | Chan |
| 2002/0003545 A1 | 1/2002 | Nakamura |
| 2002/0060566 A1 | 5/2002 | Debbins et al. |
| 2002/0107750 A1 | 8/2002 | Kanevsky et al. |
| 2003/0206654 A1 | 11/2003 | Teng |
| 2004/0059783 A1 | 3/2004 | Kazui et al. |
| 2005/0089212 A1 | 4/2005 | Mashitani et al. |
| 2006/0008171 A1 | 1/2006 | Petschnigg et al. |
| 2006/0133375 A1* | 6/2006 | Napierala ........... H04L 12/1877 370/390 |
| 2006/0225034 A1 | 10/2006 | Peck et al. |
| 2006/0262363 A1* | 11/2006 | Henley ................. G06T 5/009 358/516 |

(Continued)

OTHER PUBLICATIONS

Feder, A. et al., U.S. Appl. No. 14/503,224, filed Sep. 30, 2014.

(Continued)

*Primary Examiner* — Eueng-Nan Yeh
(74) *Attorney, Agent, or Firm* — Zilka-Kotab, PC

(57) ABSTRACT

A system, method, and computer program product are provided for generating an image result based on availability of a network resource. In use, a request is received for one or more image operations. Additionally, an availability of a network resource is identified. Next, if the network resource is not available, a result is generated using a subset of the one or more image operations. Further, if the network resource is available, a result is generated using each of the one or more image operations. Additional systems, methods, and computer program products are also presented.

18 Claims, 15 Drawing Sheets

(56) References Cited

U.S. PATENT DOCUMENTS

| | | |
|---|---|---|
| 2007/0025720 A1 | 2/2007 | Raskar et al. |
| 2007/0070364 A1* | 3/2007 | Henley ............... H04N 1/6033 358/1.9 |
| 2007/0101251 A1 | 5/2007 | Lee et al. |
| 2007/0146538 A1 | 6/2007 | Kakinuma et al. |
| 2007/0165960 A1 | 7/2007 | Yamada |
| 2007/0260979 A1 | 11/2007 | Hertzfeld et al. |
| 2008/0225057 A1 | 9/2008 | Hertzfeld et al. |
| 2008/0275881 A1 | 11/2008 | Conn et al. |
| 2009/0085919 A1 | 4/2009 | Chen et al. |
| 2010/0013842 A1 | 1/2010 | Green et al. |
| 2010/0118038 A1 | 5/2010 | Labour et al. |
| 2010/0299630 A1 | 11/2010 | McCutchen et al. |
| 2010/0329564 A1 | 12/2010 | Hervas et al. |
| 2011/0145694 A1 | 6/2011 | Graves et al. |
| 2011/0205395 A1 | 8/2011 | Levy |
| 2012/0066355 A1* | 3/2012 | Tiwari ............... H04L 65/1069 709/220 |
| 2013/0021358 A1 | 1/2013 | Nordlund et al. |
| 2013/0141456 A1 | 6/2013 | Sokolov et al. |
| 2013/0179308 A1 | 7/2013 | Agustin et al. |
| 2013/0235069 A1 | 9/2013 | Ubillos et al. |
| 2013/0262258 A1 | 10/2013 | Jennings |
| 2013/0342739 A1 | 12/2013 | Yanowitz et al. |
| 2014/0043628 A1 | 2/2014 | Kishino et al. |
| 2014/0098118 A1 | 4/2014 | Liu et al. |
| 2014/0111657 A1 | 4/2014 | Weatherford et al. |
| 2014/0129966 A1 | 5/2014 | Kolesnikov et al. |
| 2014/0140630 A1 | 5/2014 | Hwang et al. |
| 2014/0176759 A1 | 6/2014 | Goto |
| 2014/0210847 A1 | 7/2014 | Knibbeler et al. |
| 2014/0279181 A1 | 9/2014 | Wills |
| 2014/0283113 A1 | 9/2014 | Hanna |
| 2014/0289360 A1 | 9/2014 | Mahkovec et al. |
| 2014/0298323 A1 | 10/2014 | Stolberg et al. |
| 2014/0351687 A1 | 11/2014 | Hall |
| 2015/0016735 A1 | 1/2015 | Kikuchi |
| 2015/0063694 A1 | 3/2015 | Shroff et al. |
| 2015/0092077 A1 | 4/2015 | Feder et al. |
| 2015/0093044 A1 | 4/2015 | Feder et al. |
| 2015/0178977 A1 | 6/2015 | Kontkanen |
| 2015/0195330 A1 | 7/2015 | Lee |
| 2015/0373414 A1 | 12/2015 | Kinoshita |
| 2016/0092472 A1 | 3/2016 | Feder et al. |
| 2016/0110168 A1 | 4/2016 | Feder et al. |

OTHER PUBLICATIONS

Feder, A. et al., U.S. Appl. No. 14/503,210, filed Sep. 30, 2014.
Kindle, B. et al., U.S. Appl. No. 14/547,074, filed Nov. 18, 2014.
Non-Final Office Action from U.S. Appl. No. 14/503,224, dated Sep. 2, 2015.
Feder, A., et. al., U.S. Appl. No. 14/517,731, filed Oct. 17, 2014.
Feder, A. et. al., U.S. Appl. No. 14/535,285, filed Nov. 6, 2014.
Non-Final Office Action from U.S. Appl. No. 14/535,285, dated Feb. 3, 2015.
Notice of Allowance from U.S. Appl. No. 14/535,285, dated Jul. 31, 2015.
Non-Final Office Action from U.S. Appl. No. 14/517,731, dated Oct. 6, 2015.
Restriction Requirement from U.S. Appl. No. 14/503,210, dated Oct. 16, 2015.
Notice of Allowance from U.S. Appl. No. 14/535,285, dated Oct. 15, 2015.
Feder, A., et. al., U.S. Appl. No. 14/843,896, filed Sep. 2, 2015.
Non-Final Office Action from U.S. Appl. No. 14/843,896, dated Jan. 14, 2016.
Non-Final Office Action from U.S. Appl. No. 14/503,210, dated Jan. 12, 2016.
Notice of Allowance from U.S. Appl. No. 14/503,224, dated Feb. 3, 2016.
Notice of Allowance from U.S. Appl. No. 14/517,731, dated May 19, 2016.

\* cited by examiner

SYSTEM AND METHOD FOR GENERATING AN IMAGE RESULT BASED ON AVAILABILITY OF A NETWORK RESOURCE

RELATED APPLICATIONS

This application is related to the following U.S. patent application, the entire disclosures being incorporated by reference herein: application Ser. No. 14/503,210, filed Sep. 30, 2014, entitled "SYSTEMS, METHODS, AND COMPUTER PROGRAM PRODUCTS FOR DIGITAL PHOTOGRAPHY"; and application Ser. No. 14/503,224, filed Sep. 30, 2014, entitled "SYSTEMS, METHODS, AND COMPUTER PROGRAM PRODUCTS FOR DIGITAL PHOTOGRAPHY".

FIELD OF THE INVENTION

The present invention relates to digital photographic systems, and more particularly to systems and methods for generating an image result based on availability of a network resource.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is exposed differently, and then merging the multiple captures to create an image with a larger dynamic range.

SUMMARY

A system, method, and computer program product are provided for generating an image result based on availability of a network resource. In use, a request is received for one or more image operations. Additionally, an availability of a network resource is identified. Next, if the network resource is not available, a result is generated using a subset of the one or more image operations. Further, if the network resource is available, a result is generated using each of the one or more image operations. Additional systems, methods, and computer program products are also presented.

DETAILED DESCRIPTION

Figure 1:
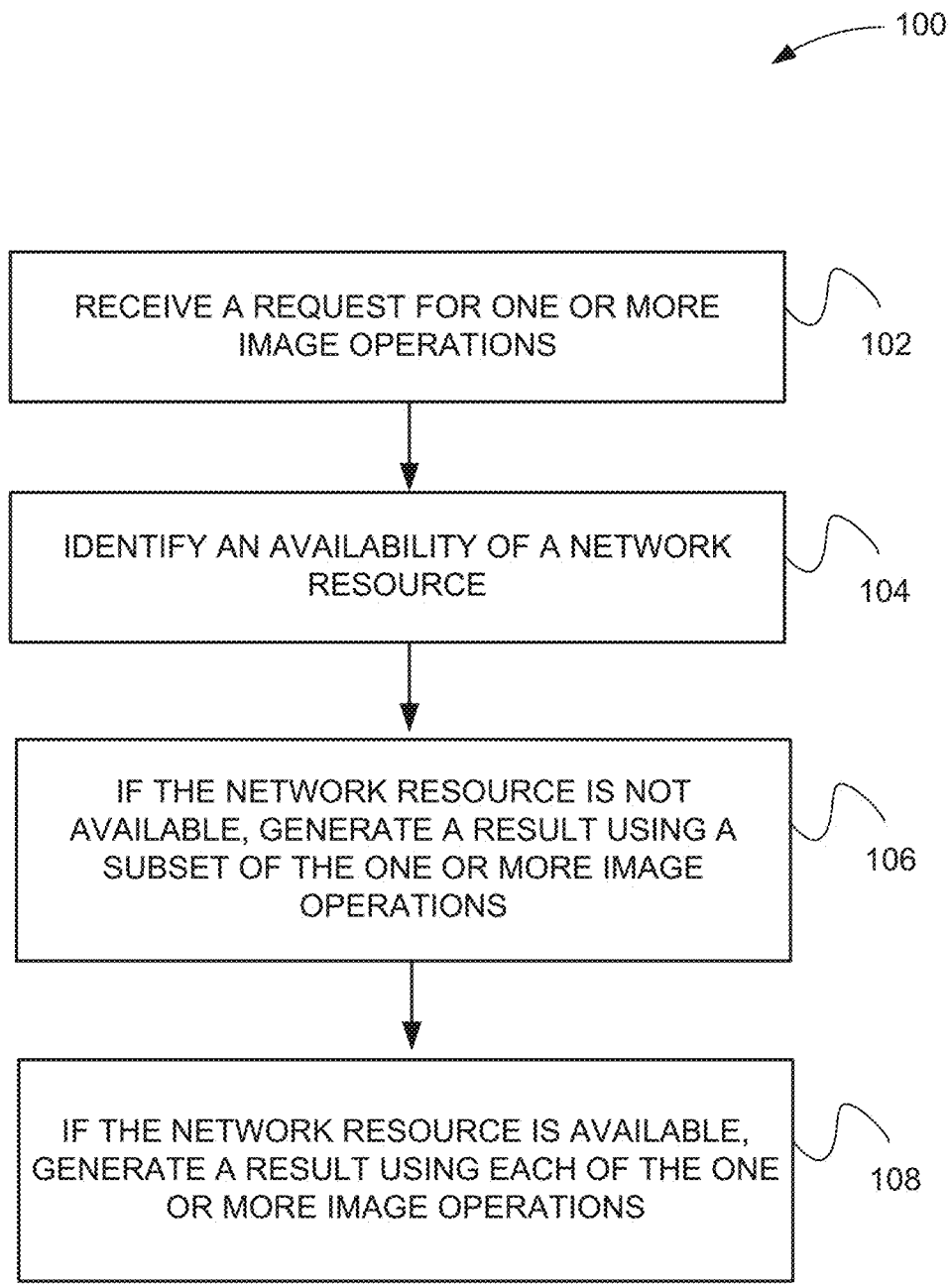
FIG. 1 shows a method for generating a result using one or more image operations, in accordance with one possible embodiment.

FIG. 1 shows a method 100 for generating a result using one or more image operations, in accordance with one embodiment. As an option, the method 100 may be implemented in the context of the details of any of the Figures. Of course, however, the method 100 may be carried out in any desired environment. Further, the aforementioned definitions may equally apply to the description below.

As shown, a request for one or more image operations is received. See operation 102. Additionally, an availability of a network resource is identified. See operation 104. If the network resource is not available, a result is generated using a subset of the one or more image operations. See operation 106. Additionally, if the network resource is available, a result is generated using each of the one or more image operations. See operation 108.

In the context of the present description, image operation may include any operation associated with an image. For example, in various embodiments, an image operation may include an enhancement (e.g. image optimization, HDR blend, alpha blend, a blur, etc.), a modification to an image parameter (e.g. contrast, saturation, exposure, white balance, etc.), and/or any other action relating to an image. Further, in one embodiment, the one or more image operations may include at least one of creating a high dynamic range (HDR) image, applying an un-blur/de-convolution, applying a de-hazing procedure, and/or applying a non-facial object identification procedure.

In a separate embodiment, the one or more image operations may include creating a high dynamic range (HDR) image, and creating the HDR image when the network resource is not available may include applying a subset of functionality of a HDR feature, whereas when the network resource is available, creating the HDR image may include applying at least one of a de-haze optimization, a contrast optimization, a white balance optimization, an exposure optimization, and/or a HDR strength optimization, or any combination thereof. In certain embodiments, white balance optimization provided by the network resource implements image region classification and region-based white balance optimization. Such region-based white balance optimization may interpret the influence of each illumination source within a scene and apply localized correction factors to each region.

In one embodiment, the one or image operations may be associated with pixel data. Additionally, in another embodiment, the pixel data may be the same data used for generating the result using the subset of the one or more image operations or for generating the result using each of the one or more image operations.

Additionally, in the context of the present description, a network resource may include any resource connected to a network. For example, in one embodiment, a network resource may be a server system, a mobile device, a computer system, and/or any other device which may be connected to a network.

In one embodiment, if the network resource is available at a time after the network resource was not available, the result generated using a subset of the one or more image operations may be regenerated using each of the one or more image operations. Further, the result generated using the subset of the one or more image operations may be used as a basis for regenerating the result using each of the one or more image operations.

In a further embodiment, the result using the subset of the one or more image operations may be the same result using each of the one or more image operations. For example, in one embodiment, a subset of the one or more image operations may include correcting the white balance, exposure, and then performing an HDR operation. In such an embodiment, a local device may perform such actions, which may produce the same result as if it had been performed by another device (e.g. a server system, etc.).

In one embodiment, availability of the network resource may be dependent on a network threshold. For example, the network threshold may include a bandwidth rate or a network speed. In one embodiment, the network threshold may be capable of being set by a user. In one embodiment, the network threshold may be automatically set. For example, the automatically setting of the network threshold may depend on the amount of data which is to be transferred. For example, in one embodiment, if the amount of data to be transferred exceeds a set amount (e.g. 500 megabytes, etc.), an increase in the network threshold may occur.

In other embodiments, more than one network threshold may exist. For example, a first network threshold may relate to a first predetermined data amount (e.g. less than 500 megabytes, etc.). In another embodiment, a second network threshold may relate to a second predetermined data amount (e.g. more than 500 megabytes, etc.).

In one embodiment, when a network resource is available, the HDR image may be created. Further, the image may be created in response to user input. In another embodiment, at least one sliding indicia may be displayed, and when the network resource is available, the HDR image may be created in response to the at least one sliding indicia being manipulated by a user. Still yet, each sliding indicia of the at least one sliding indicia may control a function of the HDR, including at least one of a sliding indicia for haze, a sliding indicia fir contrast, a sliding indicia for white balance, a sliding indicia for exposure, and/or a sliding indicia for HDR strength.

In a separate embodiment, if the network resource is not available, the result generated using a subset of the one or more image operations may be a preview of the image. Additionally, in one embodiment, the preview may be stored for a limited time period. Further, in another embodiment, if the network resource is later available, the result generated using each of the one or more image operations, may be used to replace the preview of the image. In an alternative embodiment, if the network resource is later available, the result generated using each of the one or more image operations, may be saved as a separate file from the preview of the image.

In one embodiment, a network resource may be used if a processing threshold is surpassed. For example, a processing threshold may include an expected amount of processing time (e.g. more than one minute of processing time, etc.), an expected percentage of processor capacity (e.g. exceeds 50% CPU capacity, etc.), etc. In some embodiments, it may be determined that expected processing time may be less than data transmission time (e.g. upload image to server, download image from server, etc.), therefore the client device (i.e. device which captured the image, etc.) may be used to complete the processing. In another embodiment, it may be determined that expected processing time may be more than data transmission time (e.g. upload image to server, download image from server, etc.), therefore the network resource (e.g. server device, etc.) may be used to complete the processing. In such embodiments, it is assumed that server processing time may be significantly less than a client device (i.e. a server system or cluster of computers has more processing capability, etc.), thereby allowing the processing to occur at the server in a fraction of the time it would otherwise take on the client device.

In another embodiment, a photo is captured by a client device, uploaded to a server, processed by the server, and a resulting image is sent back from the server to the client device. In such an embodiment, the resulting image may, at least one of, be saved as a new image on the client device, replace the original image on the client device, etc. In a separate embodiment, a server may not be accessible. In such an embodiment, a subset of available features may be implemented on the client device until the server is accessible, whereupon higher processing features (e.g. de-convolution, etc.) may occur on the server.

In one embodiment, one or more operations implemented on a local device may be different than one or more operations implemented on a server device. For example, in one embodiment, a local device may correct white balance (e.g. by using device hardware, etc.), whereas the server device may optimize a HDR (e.g. de-haze operation, etc.). In such an embodiment, the HDR optimization may not be available on the local device (e.g. it may require too much processing power, etc.), and the correcting of white balance may not be available on the server system (e.g. local device hardware may not be accessible by the server, etc.).

In various embodiments, a server may transmit an image back to a client device, the transmitting may include sending an image package to a client device, and/or a web page (e.g. for manipulation, for input, etc.) associated with the processed image. In one embodiment, the web page may be associated with a direct object (DIO) package. Of course, any functionality associated with a DIO may be included, utilizing the systems and methods disclose within U.S. patent application Ser. No. 14/503,210, filed Sep. 30, 2014 and entitled "SYSTEMS, METHODS, AND COMPUTER PROGRAM PRODUCTS FOR DIGITAL PHOTOGRAPHY" and U.S. patent application Ser. No. 14/503,224, filed Sep. 30, 2014 and entitled "SYSTEMS, METHODS, AND COMPUTER PROGRAM PRODUCTS FOR DIGITAL PHOTOGRAPHY".

In one embodiment, if a network resource processes an image, the resulting image may be stored on the server device, and/or may also be sent back to the client device for storage. In such an embodiment, a "before" and "after" version of the photo may be displayed to the user. For example, in one embodiment, a client device may initially correct the white balance associated with an image (e.g. using hardware, etc.) and send the captured image to a server for processing. After processing, the server may send the image back to the client device and may display both the original image (as stored on the device) and the new processed image from the server. In this manner, a user may select which image should be stored on the client device, including, for example, discarding processing by the server, replacing the photo stored on the client device with the processed photo from the server, retaining the photo stored on the client device and storing additionally the processed photo from the server as a separate photo, and/or providing input to further process the processed image as sent from the server.

As a separate example, in one embodiment, a user may be at a location where a network resource is not accessible, such as a plane. A photo may be captured while at the location and a network resource (e.g. a server, etc.) may not be available for processing of the captured photo. Nonetheless, the user may desire to view the captured photo. As such, the captured photo can be viewed and one or more image operations (e.g. of limited functionality in comparison to the server system, etc.) may be implemented on the local device. And once the user returns to a location where a network resource is accessible, the image may be further processed and enhanced by the network resource (e.g. server, etc.).

In various embodiments, if a network resource is not available, a client device may perform one or more image operations, including but not limited to basic HDR, de-hazing, contrast enhancement, and/or white balance correction. In other embodiments, a server may perform, at a minimum, the same one or more image operations as the client device, and may also further provide rich optimization processing, including, but not limited to, de-blurring/de convolve operations, layer blending, multipoint corrections (e.g. based on white balance, based on exposure points, etc.), a non-facial object or product identification operation, etc.

In one embodiment, once a network resource is available, processing by the network resource may include at least some identification of non-facial items. For example, products, items, brands, locations, monuments, and/or any other items may be recognized and identified. As an example, in one embodiment, an image may be captured of a man standing in front of the White House. In such an embodiment, once a network resource is available, processing by the network resource may include identifying the building as the "White House," identifying his shirt as being sold by Abercrombie & Fitch™ (or any other distinguishable article of clothing, etc.), identifying the location based on the surroundings either in conjunction with geo-tag data or not (e.g. northwest corner of the lot next to the White House, etc.), and/or identifying any other item captured in the photo.

In this manner, processing may include not only enhancing and/or optimizing the captured image but further, identifying one or more items associated with the photo. In one embodiment, identifying one or more items associated with the photo may include facilitating the purchase of an item. For example, in one embodiment, an image taken may identify a sports cap as the "49ers" and selecting the cap in some manner (e.g. through user interaction, etc.) may provide the user an option of purchasing a cap of similar look. Or, in another embodiment, an image taken may be of a sailboat identified as being in the San Francisco harbor. After capturing the image, an option may be presented to the user to display one or more establishments in the general vicinity where the user can rent, buy, or use a sailboat in the San Francisco Bay. Of course, the foregoing examples are not intended to be limiting in any manner. Rather, they are intended to demonstrate, in part, some of the possibilities associated with identifying one or more items associated with a photo.

Additionally, although the identification of one or more items associated with a photo may occur in near real-time (e.g. near immediate after the capturing of an image, etc.) when a network resource is available, the identification may also be deferred until a later time if a network resource is unavailable. In this manner, server processing may be used to enhance and optimize the captured images, as well as identify pertinent information within the captured images.

Furthermore, in one embodiment, the processing may be used for batch processing. For example, in one embodiment, a large number of photos (e.g. 500, etc.) may have been captured. In one embodiment, if the rate of capture exceeds a data connection, then images may be placed in a queue for transfer to and processing by the server. In another embodiment, if a network resource is not available, the captured images may be sent to the server once the network resource becomes available. Further, in one embodiment, batch processing may be associated with a threshold, such as a data threshold. For example, in one embodiment, a data limit may be imposed by a cell phone network plan. In such an embodiment, if the data plan is nearing its limit, one or more images may be placed into a queue for transfer and processing by the server. In one embodiment, the queue may be unloaded once the device's connection to a network changes (e.g. switch from carrier network to WiFi, etc.). In this manner, images may be transferred and processed once a desired network is made available.

Figure 2:
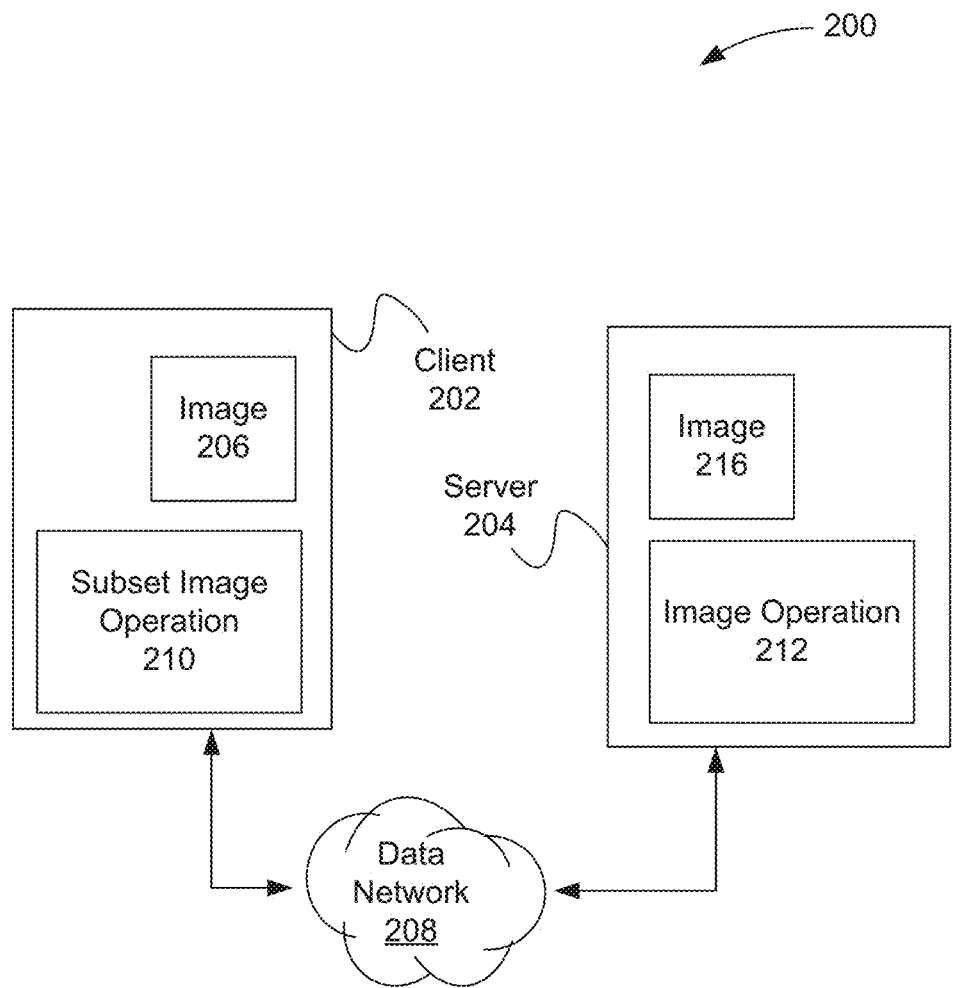
FIG. 2 shows a system for generating a result using one or more image operations, in accordance with one embodiment.

FIG. 2 shows a system 200 for generating a result using one or more image operations, in accordance with one embodiment. As an option, the system 200 may be implemented in the context of the details of any of the Figures. Of course, however, the system 200 may be carried out in any desired environment. Further, the aforementioned definitions may equally apply to the description below.

As shown, a client 202 may include one or more images 206, and a subset of one or more image operations 210. Additionally, a server 204 may include one or more images 216, and one or more image operations 212. The client 202 and the server 204 may communicate via a data network 208.

In one embodiment, the data network may include an intranet, extranet (e.g. internet, etc.), local network system, cellular network, wireless data network, and/or any other networking system which may connect the client and the server. In one embodiment, the client may include any device which may connect to a central system, such as a server. In another embodiment, one or more images 216 may include one or more images 206. However, in other embodiments, the one or more images 216 and 206 may differ. For example, the one or more images 216 may be generated by processing the one or more images 206.

As described herein, image operation may include any operation associated with an image. For example, in various embodiments, an image operation may include an enhancement (e.g. image optimization, HDR blend, alpha blend, a blur, etc.), a modification to an image parameter (e.g. contrast, saturation, exposure, white balance, etc.), and/or any other action relating to an image. Further, in one embodiment, the one or more image operations may include at least one of creating a high dynamic range (HDR) image, applying a blur, and/or applying a de-hazing procedure.

In a separate embodiment, the one or more image operations may include creating a high dynamic range (HDR)

image, and creating the HDR image when the network resource is not available may include applying a subset of functionality of a HDR feature, whereas when the network resource is available, creating the HDR image may include applying at least one of a haze optimization, a contrast optimization, a white balance optimization, an exposure optimization, and/or a HDR strength optimization.

In one embodiment, the one or more image operations may be associated with pixel data. Additionally, in another embodiment, the pixel data may be the same data used for generating the result using the subset of the one or more image operations or for generating the result using each of the one or more image operations.

In another embodiment, one or more images 206 may be captured on client 202. The client 202 may perform one or more image operations (e.g. white color balance, etc.) 210. Additionally, when server 204 is available via the data network 208, the one or more images 206 may be sent from the client 202 to the server 204 and stored on the server as one or more images 216. After receipt of the one or more images, the server 204 may perform one or more image operations 212. In this manner, in one embodiment, the one or more images 206 may receive one or more image operations 210, be sent to the server 204, and receive further one or more image operations 212.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
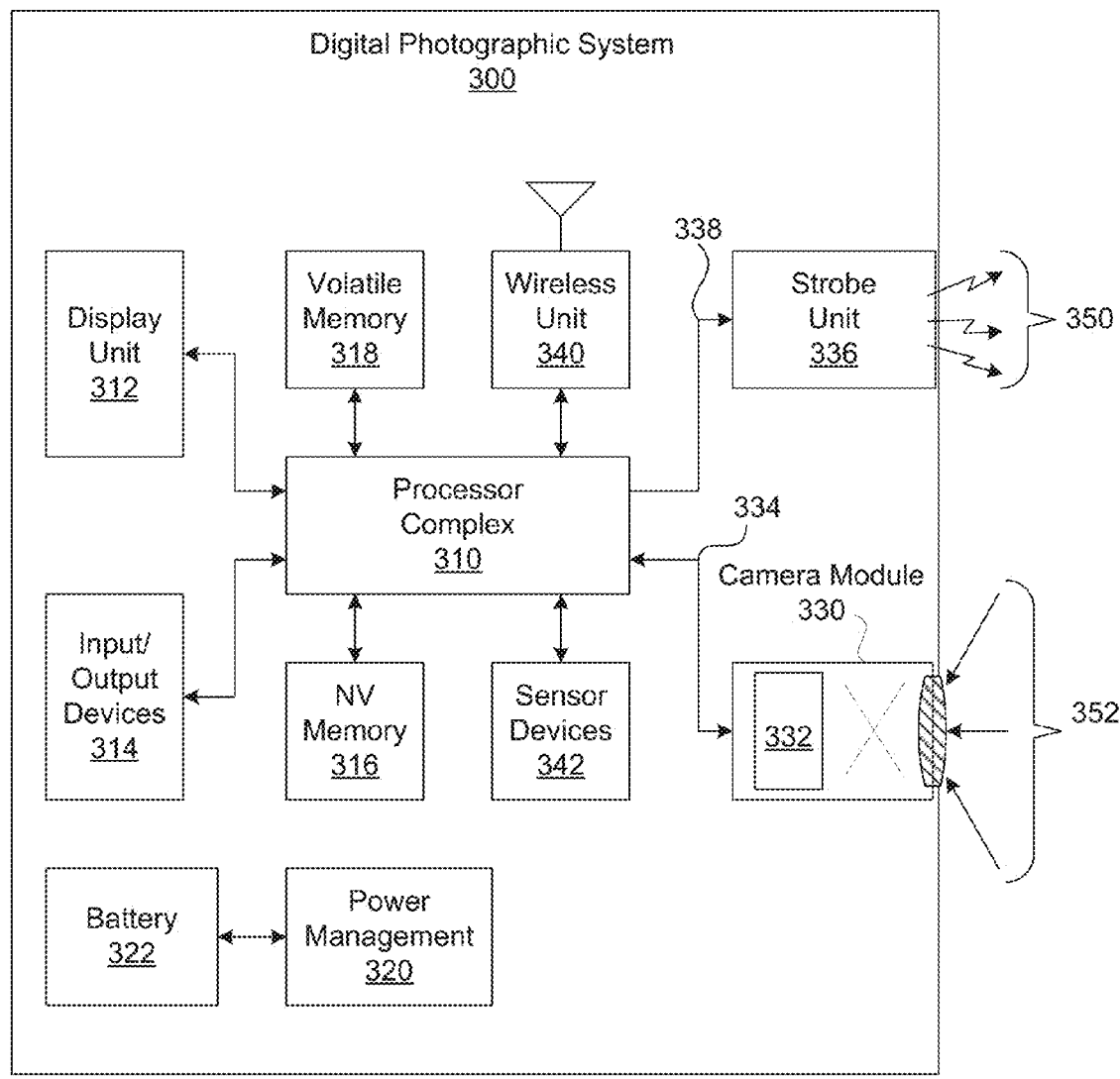
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise asocial networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
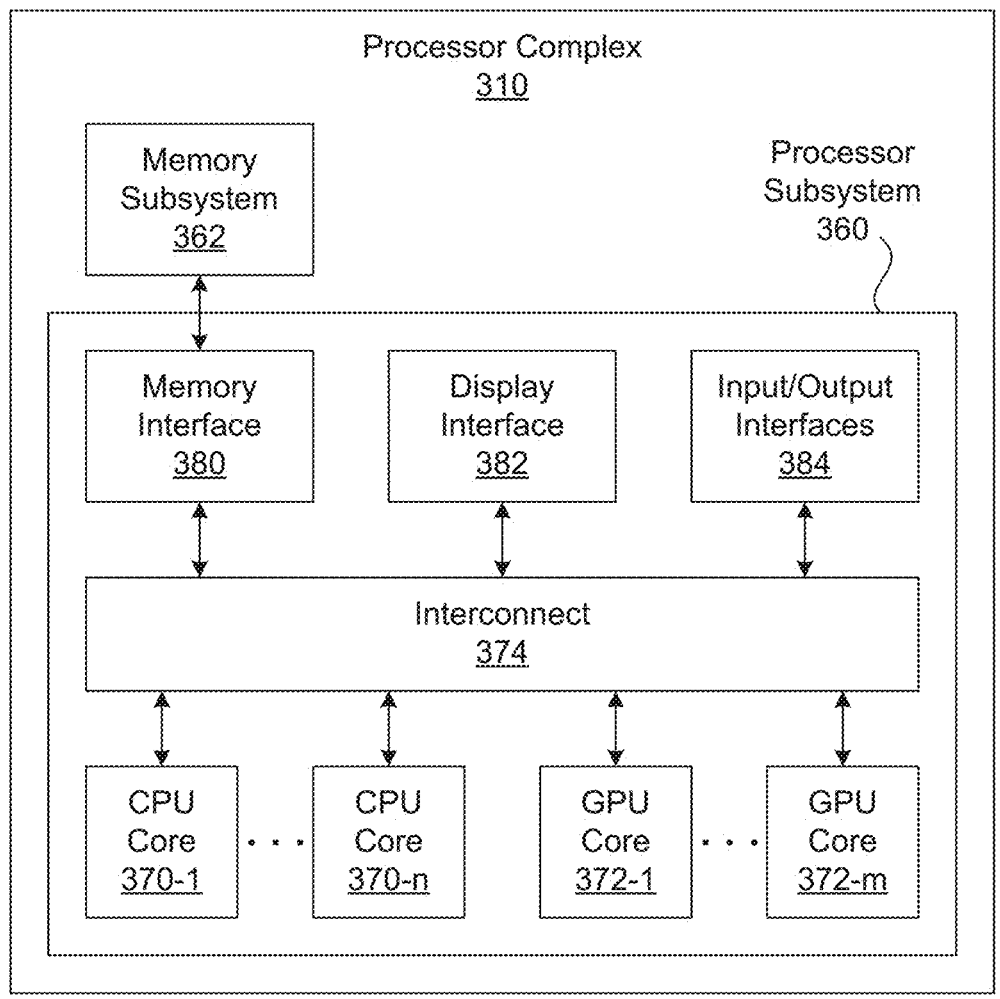
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters tier one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
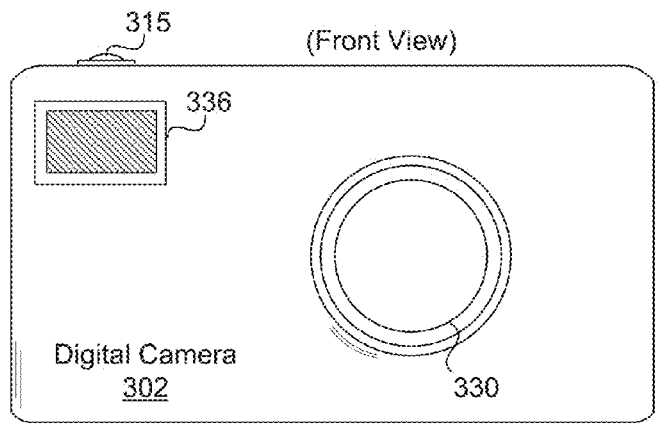
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc).

Figure 3D:
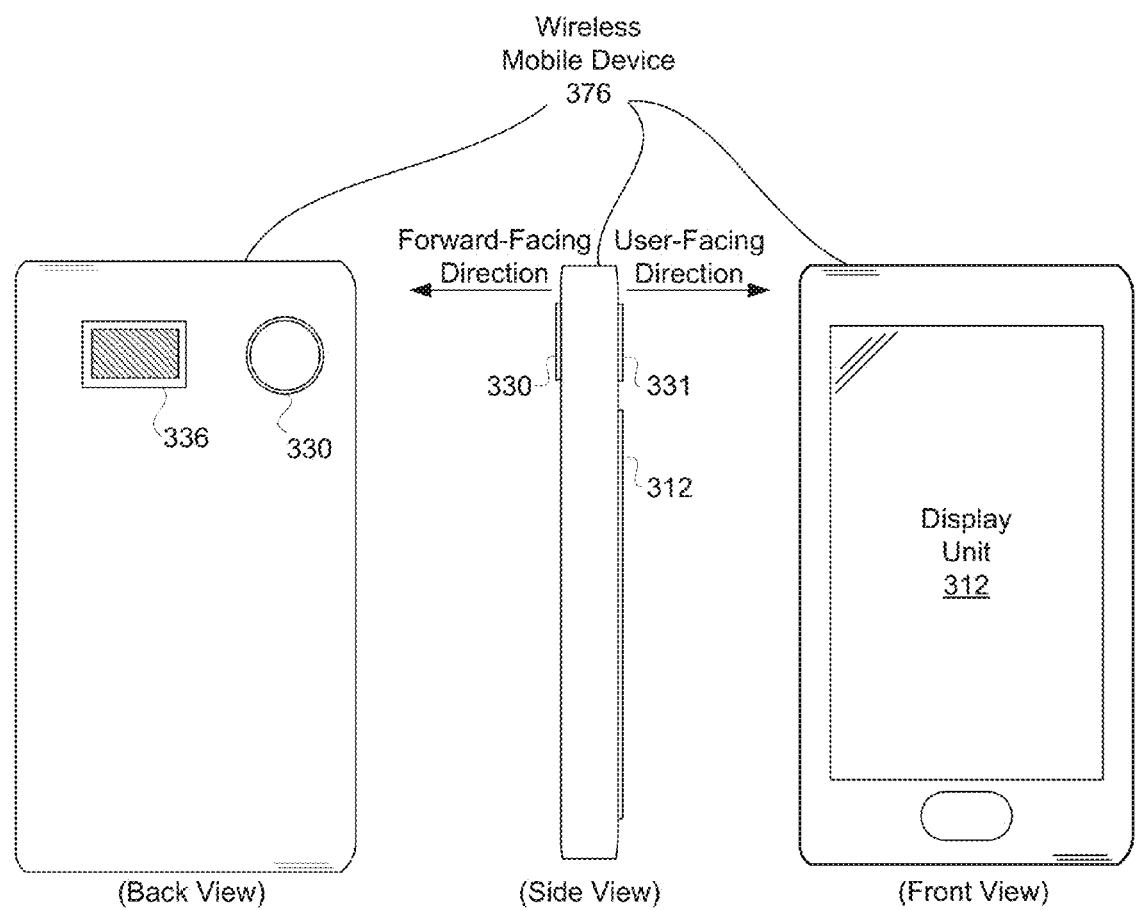
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
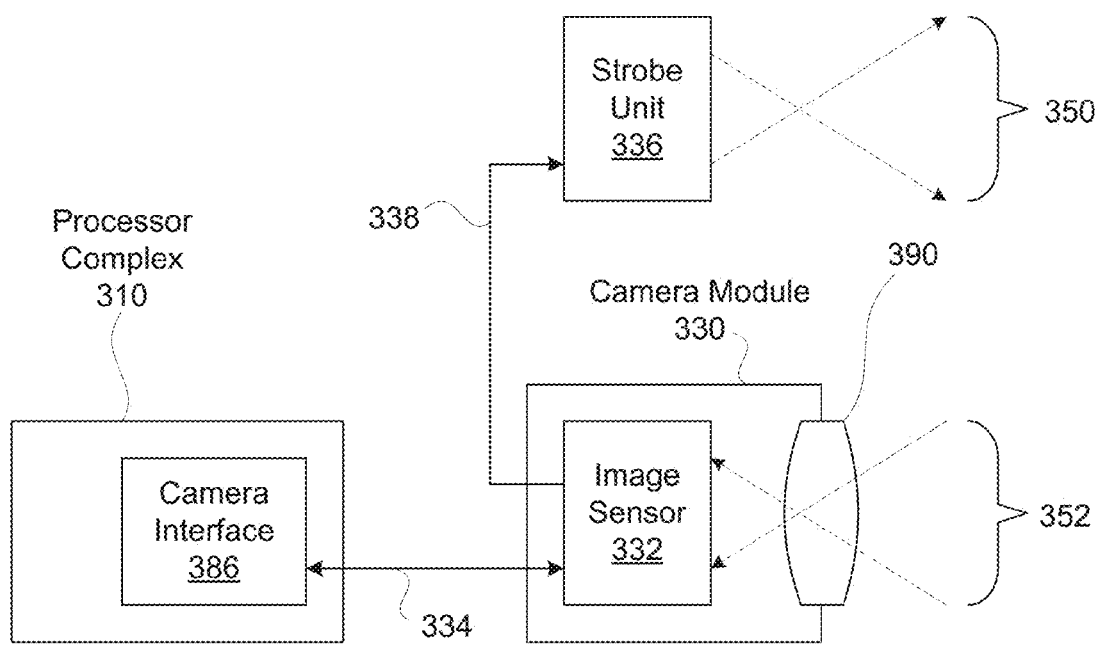
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (for any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
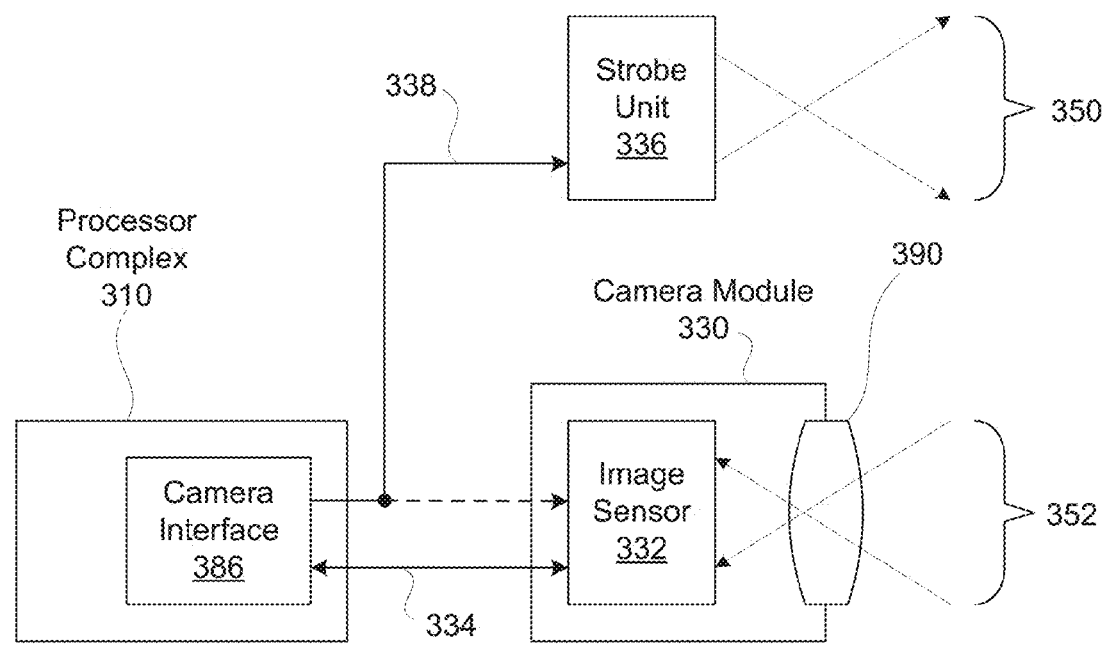
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white balance. Any technically feasible color statistics may be accumulated for estimating white balance, such as a sum of intensities for different color channels comprising red, green, and blue color channels. The sum of color channel intensities may then be used to perform a white balance color correction on an associated image, according to a white balance model such as a gray-world white balance model. In other embodiments, curve-fitting statistics are accumulated for a linear or a quadratic curve fit used for implementing white balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
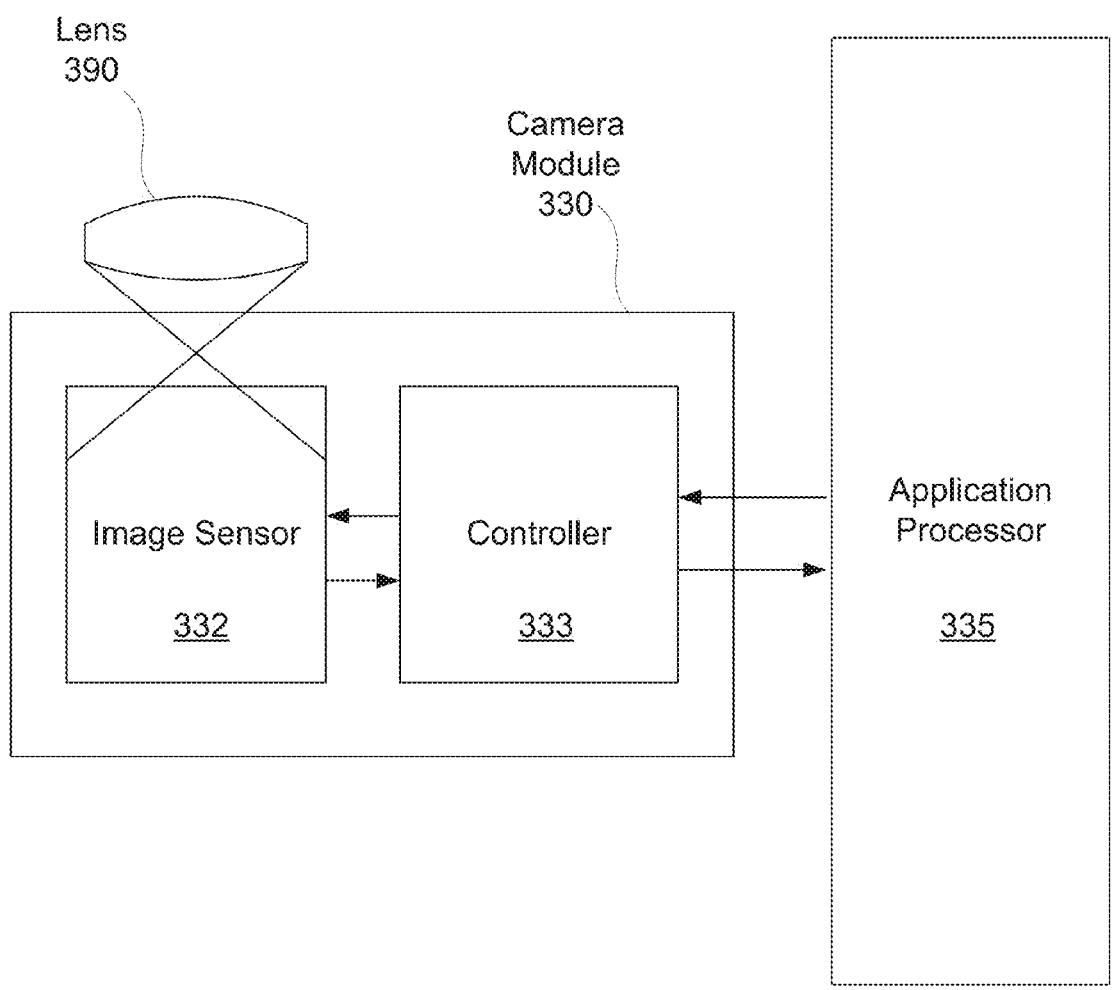
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shattering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured fir processing of received optical scene information or digital pixel data communicated from the camera module 330 to the application processor 335.

Figure 4:
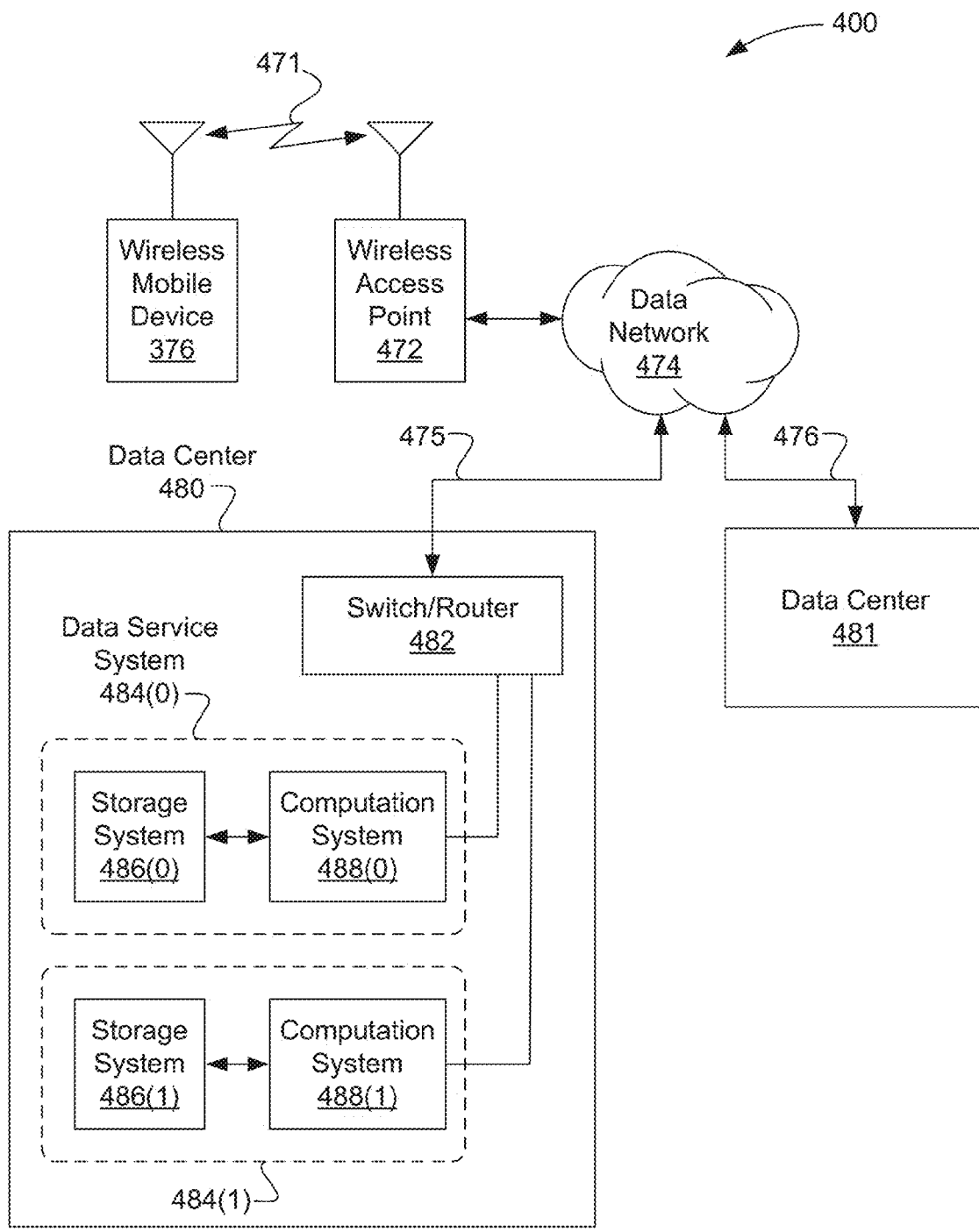
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, tong-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
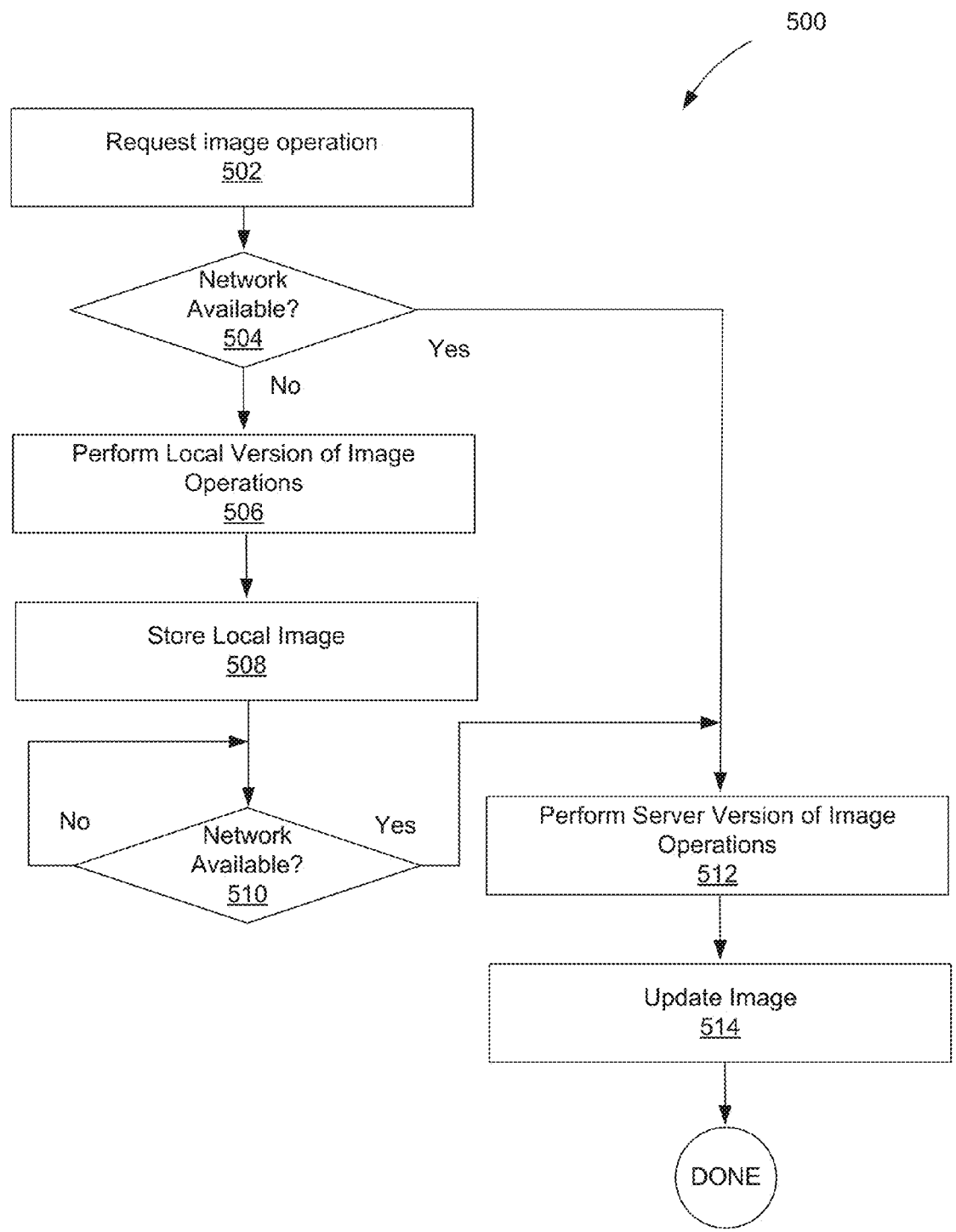
FIG. 5 shows a method for determining if a network is available, in accordance with one embodiment.

FIG. 5 shows a method 500 for determining if a network is available, in accordance with one embodiment. As an option, the method 500 may be implemented in the context of the details of any of the Figures. Of course, however, the method 500 may be carried out in any desired environment. Further, the aforementioned definitions may equally apply to the description below.

As shown, an image operation is requested. See operation 502. Next, it is determined if a network is available. See decision 504. If it is determined a network is not available, a local version of image operations is performed. See operation 506. Next, the local image is stored. See operation 508. It is then determined if a network is available. See decision 510. If it is determined that a network is not available, then the flow loops back to decision 510.

If it is determined that a network is available (either by decision 504 or 510), then a server version of image operations is performed. See operation 512. Next, the image is updated. See operation 514.

In one embodiment, the local version of image operations 506 may be performed regardless of whether the network is available. For example, in one embodiment, the client device may utilize a hardwired component to correct the white balance (or any desired parameter, etc.). In other embodiments, before a local version of image operations 506 is performed, it may be determined whether a network is available, and if it is, then local version of image operations 506 may not be performed.

In another embodiment, determining whether a network is available may include determining whether a network resource (e.g. a server, etc.) is available. In other embodiments, determining whether a network is available may include determining whether a preferred network is within range (e.g. local WiFi network, Bluetooth network, etc.). In certain embodiments, determining whether a network is available may include attempting to contact a wireless access point, such as a WiFi access point or a cellular access point. Contact with the less access point may be initially established through any technically feasible discovery protocol.

In some embodiments, a network may be available but a network resource (e.g. server, etc.) may not be available. In such an embodiment, a local version of image operations (operation 506) may be performed, and local image may be stored (operation 508) until the network resource is available. In certain embodiments, determining whether a network resource is available may include attempting to contact the network resource, such as through a well-known URL or a well-known interact protocol (IP) address. Any technically feasible authentication and/or authorization mechanism may be implemented to permit access to the network resource by a client device.

In one embodiment, updating an image, operation 514, may include, but not be limited to, sending the server-processed one or more images back to a client, saving the one or more images to storage (local storage or networked storage, e.g. an online database system, Dropbox™ service, Onedrive™ service, etc.), embedding metadata relating to information identified (e.g. products, brand, location, etc.) in the one or more images, sending the one or more images to a specific location (e.g. destination address, etc.), and/or taking any other action relating to the server-processed one or more images.

Figure 6:
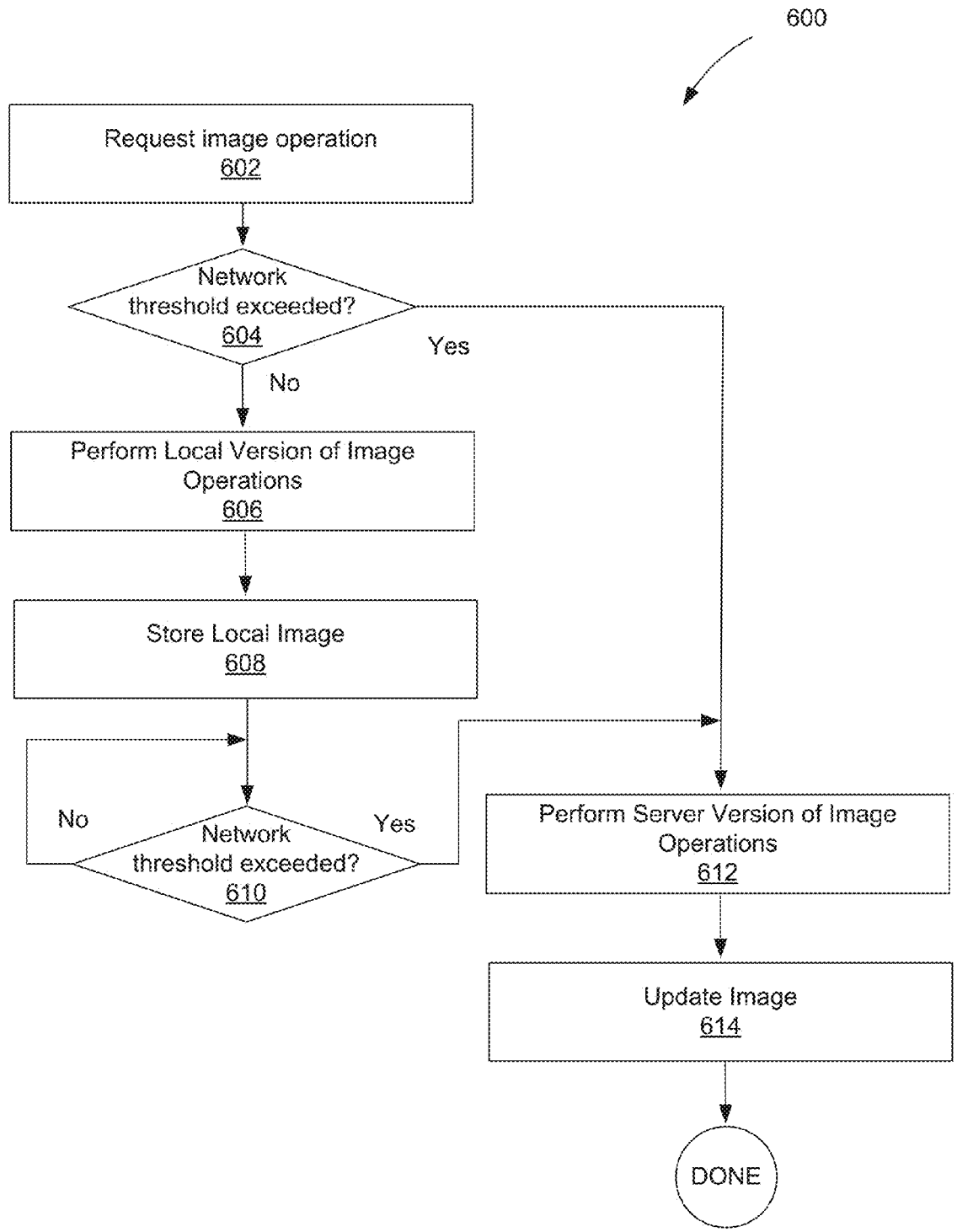
FIG. 6 shows a method for determining if a network threshold is exceeded, in accordance with one embodiment.

FIG. 6 shows a method 600 for determining if a network threshold is exceeded, in accordance with one embodiment. As an option, the method 600 may be implemented in the context of the details of any of the Figures. Of course, however, the method 600 may be carried out in any desired environment. Further, the aforementioned definitions may equally apply to the description below.

As shown, an image operation is requested. See operation 602. Next, it is determined if a network threshold (e.g. an available transmission data rate) is exceeded. See decision 604. If it is determined a network threshold is not exceeded, a local version of image operations is performed. See operation 606. After, the local image is stored. See operation 608. It is then determined if a network threshold is exceeded. See decision 610. If it is determined that a network threshold is not exceeded, then the flow loops back to decision 610.

If it is determined that a network threshold is exceeded (either by decision 604 or 610), then a server version of image operations is performed. See operation 612. Next, the image is updated. See operation 614.

In one embodiment, a network threshold may be a minimum upload rate, minimum download rate, percentage of timeout for calls, percentage of erroneous outbound packets, percentage of erroneous inbound packets, a network type (e.g. wifi, etc.) and/or any other network metric. In another embodiment, more than one threshold may exist with a network threshold. For example, in one embodiment, a first threshold may require a minimum of 1 megabit per second upload rate for images (or videos) in excess of 100 megabytes, and a second threshold may require a WiFi connection for images (or videos) in excess of 500 megabytes. Of course, in other embodiments, the thresholds may be altered and/or configured in any manner.

In one embodiment, the local version of image operations 606 may be performed regardless of whether the network threshold is exceeded. For example, in one embodiment, the client device may utilize a hardwired component to correct the white balance (or any desired parameter, etc.). In other embodiments, before a local version of image operations 606 is performed, it may be determined whether a network threshold is exceeded, and if it is, then local version of image operations 606 may not be performed.

In some embodiments, a network threshold may be met but a network resource (e.g. server, etc.) may not be available. In such an embodiment, a local version of image operations (operation 606) may be performed, and local image may be stored (operation 608) until the network resource is available.

In one embodiment, updating an image, operation 614, may include, but not be limited to, sending the server-processed one or more images back to a client, saving the one or more images to storage (local storage or networked storage, e.g. an online database system, Dropbox™ service, Onedrive™ service, etc.), embedding metadata relating to information identified (e.g. products, brand, location, etc.) in the one or more images, sending the one or more images to a specific location (e.g. destination address, etc.), and/or taking any other action relating to the server-processed one or more images.

Figure 7:
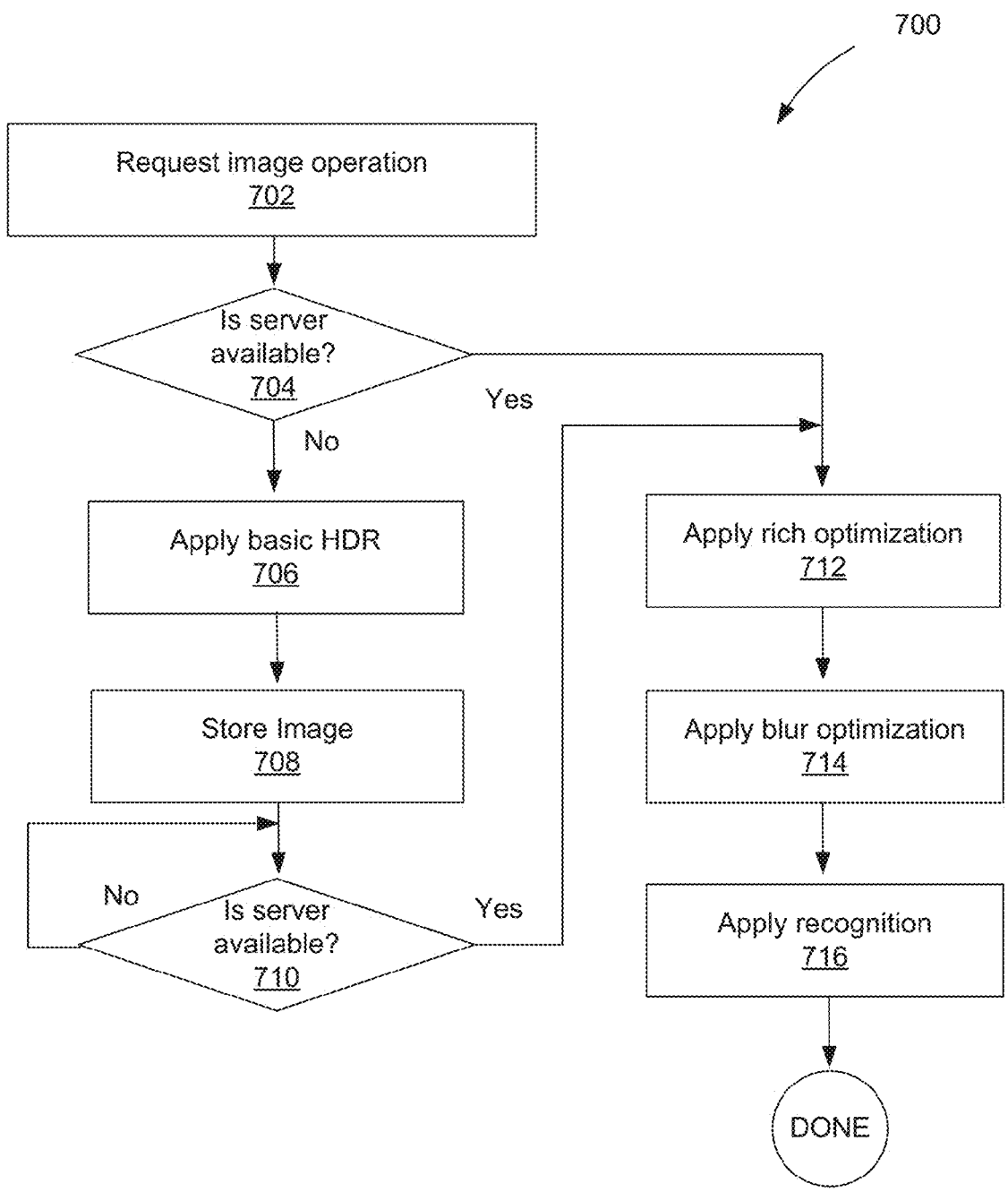
FIG. 7 shows a method for determining if a server is available, in accordance with one embodiment.

FIG. 7 shows a method 700 for determining if a server is available, in accordance with one embodiment. As an option, the method 700 may be implemented in the context of the details of any of the Figures. Of course, however, the method 700 may be carried out in any desired environment. Further, the aforementioned definitions may equally apply to the description below.

As shown, an image operation is requested. See operation 702. Next, it is determined if a server is available. See decision 704. If it is determined a server is not available, a basic HDR is applied. See operation 706. After, the image is stored. See operation 708. It is then determined if a server is available. See decision 710. If it is determined that a server is not available, then the flow loops back to decision 710.

If it is determined that a server is available (either by decision 704 or 710), then a server may apply rich optimization (operation 712), a blur optimization (operation 714), and/or recognition (operation 716), or any combination thereof.

In various embodiments, if a server is not available, a client device may perform one or more image operations, including but not limited to basic HDR, de-hazing, contrast enhancement, and/or white balance correction. In other embodiments, a server may perform, at a minimum, the same one or more image operations as the client device, and may also further provide rich optimization processing, including, but not limited to, blurring, de-convolve/de-convolution operations, layer blending, multi-point corrections (e.g. based on white balance, based on exposure points, etc.), etc.

In one embodiment, once a server is available, processing by the server may include at least some recognition and/or identification of non-facial items. For example, products, items, brands, locations, monuments, and/or any other items may be recognized and identified. As an example, in one embodiment, an image may be captured of a man standing in front of the White House. In such an embodiment, once a network resource is available, processing by the network resource may include identifying the building as the "White House," identifying his shirt as being sold by Abercrombie & Fitch™ (or any other distinguishable article of clothing, etc.), identifying the location based on the surroundings (e.g. northwest corner of the lot next to the White House, etc.), and/or identifying any other item captured in the photo. Other embodiments relating to the recognition and/or identification of non-facial items may be applicable as disclosed herein.

Figure 8:
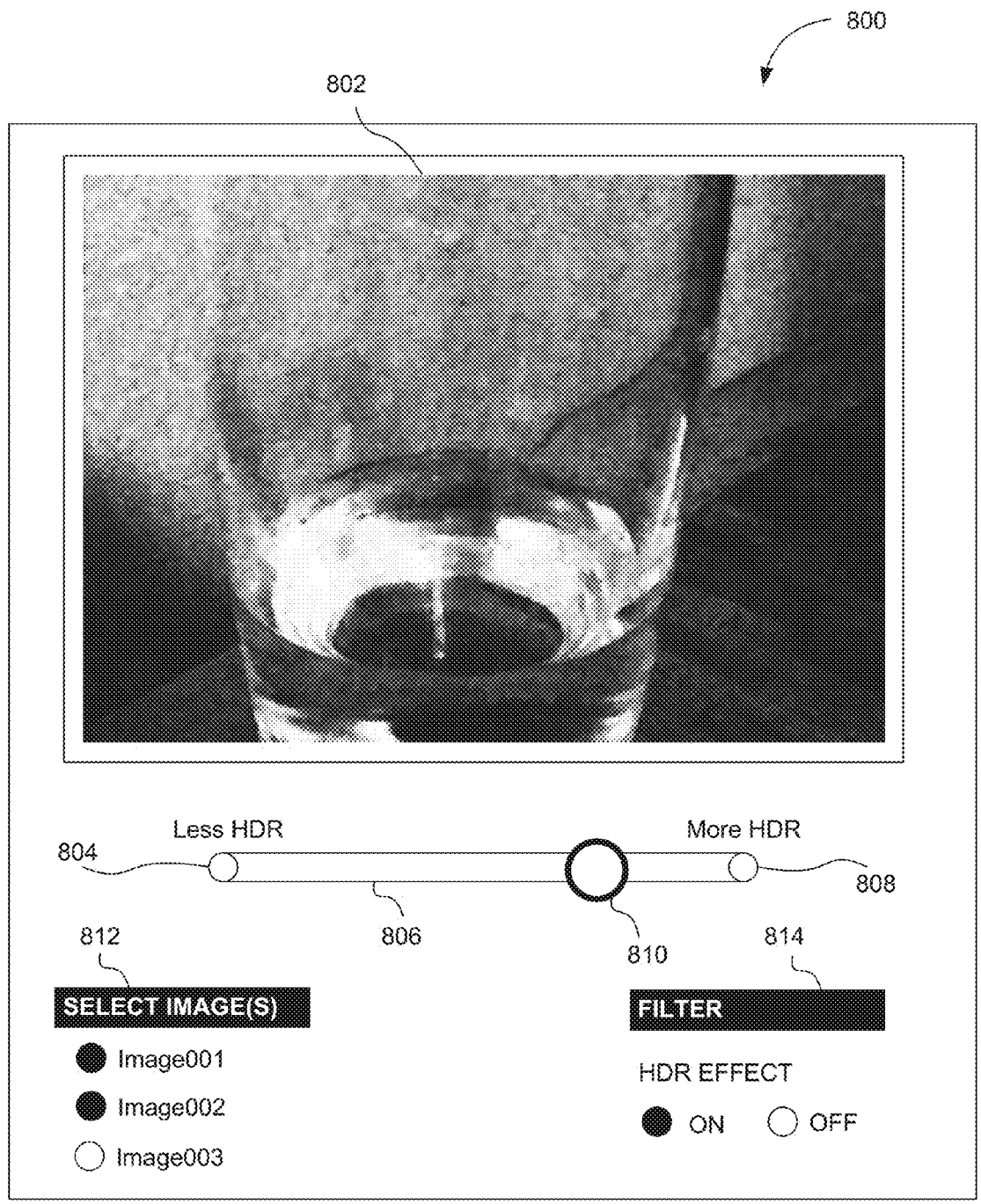
FIG. 8 shows a user interface for requesting one or more image operations, in accordance with one embodiment.

FIG. 8 shows a user interface 800 for requesting one or more image operations on a local device, in accordance with one embodiment. As an option, the user interface 800 may be implemented in the context of the details of any of the Figures. Of course, however, the user interface 800 may be carried out in any desired environment. Further, the aforementioned definitions may equally apply to the description below.

As shown, the user interface 800 may include an image 802, a first indication point 804, a slider track 806, a second indication point 808, a slider control 810, an image selection 812, and a filter 814. In various embodiments, the user interface 800 may be implemented for a local device, for a mobile device, and/or for any other device apart from the server.

In one embodiment, the slider track 806 may be dependent on the selected filter 814. For example, in one embodiment, the filter may include a HDR effect, the slider being configured to alter the HDR effect between "less HDR" (e.g. first indication point 804, etc) and "more HDR" (e.g. second indication point 808, etc.), the configuration occurring through input on a slider control 810. In other embodiments, the filter 814 comprises a filter selection tool, which may enable the user to select one or more filters to be individually or collectively applied to generate the image 802. In certain embodiments, the filter selection tool provides a set of locally available filters, a set of server-based filters, or a combination thereof.

In one embodiment, the image 802 being displayed may include one or more images. For example, in one embodiment, the filter being applied may relate to a basic HDR feature which may blend two or more images. In one embodiment, image selection 812 may be used to select which images are used for the filter. In other embodiments, image selection may ha carried out using a thumbnail selector, a swipe gesture, or any other technically feasible image selection techniques.

In another embodiment, the filters 814 displayed may be dependent on the type of network connection, one or more network thresholds, availability of a network resource, availability of a server, and/or any other requirement. For example, in one embodiment, if a network resource (e.g. server, etc.) is not available, then more filters may be displayed on user interface 800. In another embodiment, if a network resource (e.g. server, etc.) is available, then fewer filters may be displayed on user interface 800. For example, in one embodiment, if a network resource is available, then the user may only have the ability to perform a basic HDR. In another embodiment, if a network resource (e.g. server, etc.) is not available, then the user may have the ability to perform a basic HDR, modify the exposure, modify the saturation, modify the color scheme, and/or potentially change any other parameter associated with the image.

Figure 9:
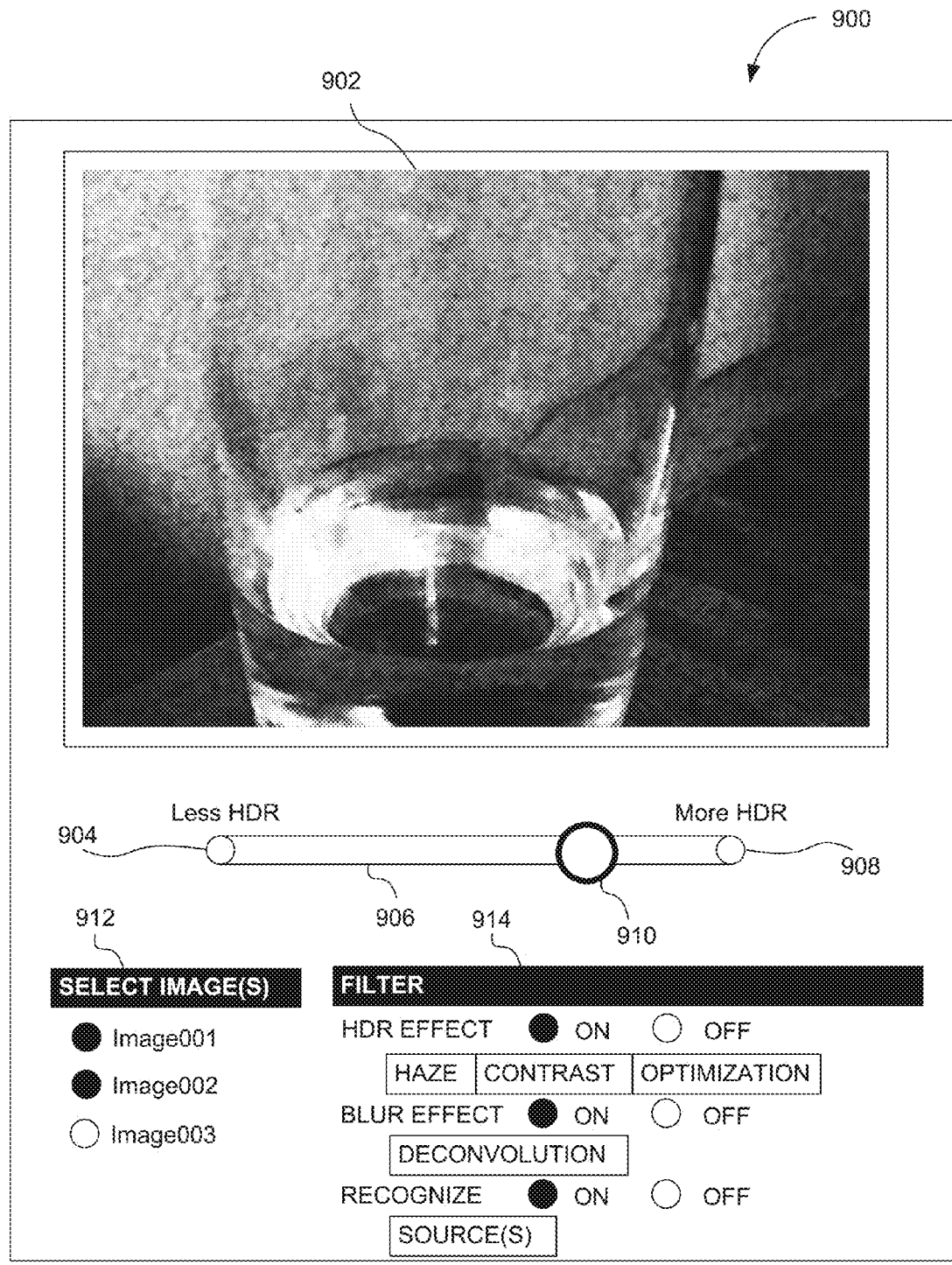
FIG. 9 shows a user interface for requesting one or more image operations on a server device, in accordance with one embodiment.

FIG. 9 shows a user interface 900 for requesting one or more image operations on a server device, in accordance with one embodiment. As an option, the user interface 900 may be implemented in the context of the details of any of the Figures. Of course, however, the user interface 900 may be carried out in any desired environment. Further, the aforementioned definitions may equally apply to the description below.

As shown, the user interface 900 may include an image 902, a first indication point 904, a slider track 906, a second indication point 908, a slider control 910, an image selection 912, and a filter 914. In various embodiments, the user interface 900 may be implemented in association with a server device. For example, in one embodiment, the user interface 900 may be used to control, at least in part, one aspect associated with the server device.

In one embodiment, the slider track 906 may be dependent on the selected filter 914. For example, in one embodiment, the filter may include a HDR effect, the slider being configured to alter the HDR effect between "less HDR" (e.g. first indication point 804, etc.) and "more HDR" (e.g. second indication point 808, etc.), the configuration occurring through input on a slider control 810.

In one embodiment, the image 902 being displayed may include one or more images. For example, in one embodiment, the filter being applied may relate to a HDR feature which may blend two or more images. In one embodiment, image selection 912 may be used to select which images are used for the filter.

In various embodiments, the filter 914 may include, but not be limited to, a HDR effect, a blur effect, and/or recognize or identify objects within image 902. In one embodiment, a HDR effect may include the ability to control a haze, contrast, and/or any other parameter, as well as the ability to select to optimize the image. In another embodiment, a blur effect may include the ability to control the de-convolution of the image. Additionally, in one embodiment, recognizing or identifying objects may include the ability to identify and/or recognize non-facial items. For example, products, items, brands, locations, monuments, and/or any other items may be recognized and identified, consistent with the disclosure herein. Furthermore, such recognition/identification may be deferred based on network availability, and may additionally be performed in conjunction with identifying sources from which to purchase one or more identified items within image 902.

Figure 10:
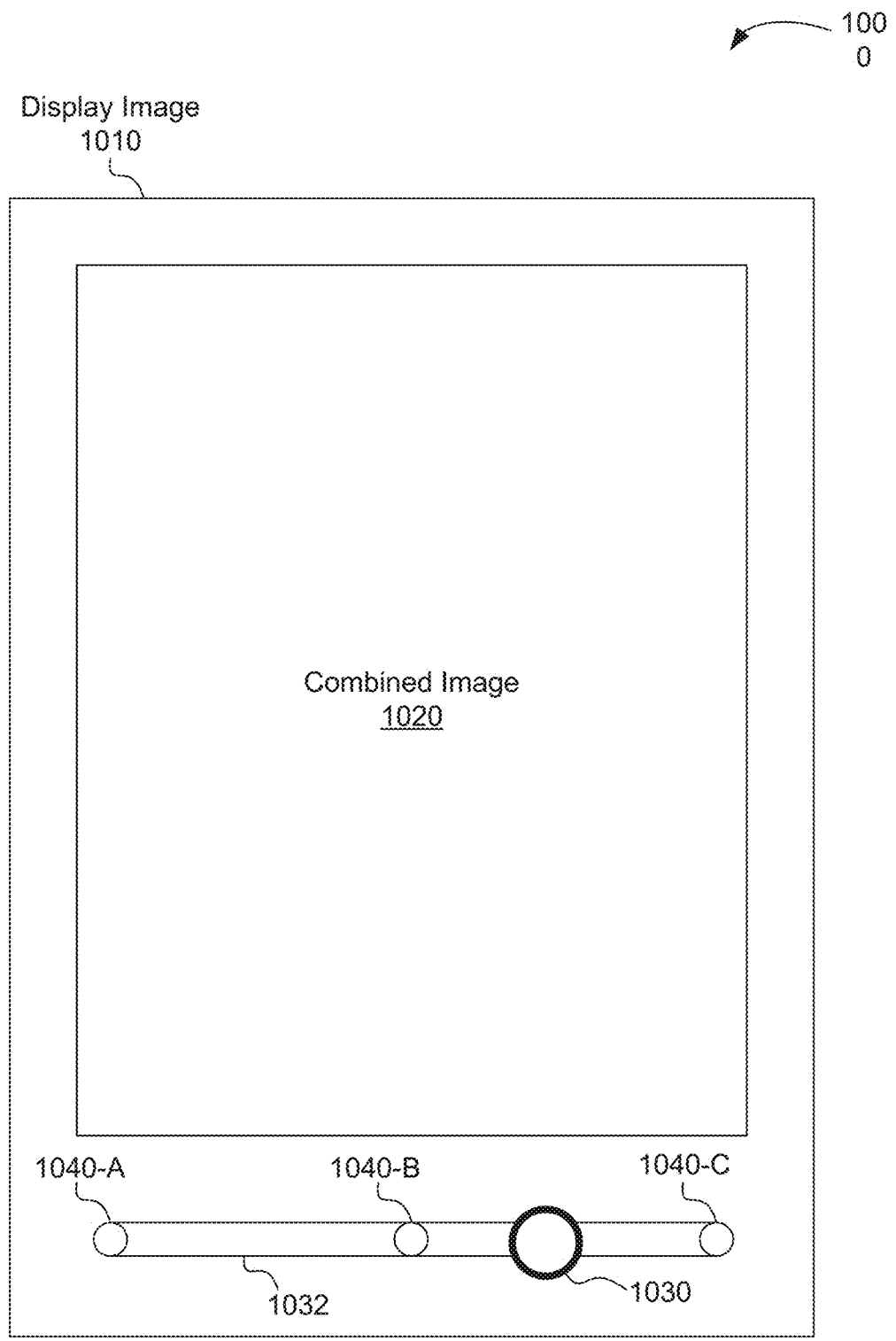
FIG. 10 illustrates a user interface (UI) system for generating a combines image, according to one embodiment.

FIG. 10 illustrates a user interface (UI) system 1000 for generating a combined image 1020, according to one embodiment. As an option, the UI system 1000 may be implemented in the context of the details of any of the Figures disclosed herein. Of course, however, the UI system 1000 may be carried out in any desired environment. Further, the aforementioned definitions may equally apply to the description below.

In one embodiment, a combined image 1020 comprises a combination of at least two related digital images. In one embodiment, the combined image 1020 comprises, without limitation, a combined rendering of a first digital image and a second digital image, such first digital image 732 and second digital image 734 of FIG. 7. In another embodiment, the digital images used to compute the combined image 1020 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel or frame-by-frame basis.

In one embodiment, the UI system 1000 presents a display image 1010 that includes, without limitation, a combined image 1020, a slider control 1030 configured to move along track 1032, and two or more indication points 1040, which may each include a visual marker displayed within display image 1010.

In one embodiment, the UI system 1000 is generated by an adjustment tool executing within a processor complex 310 of a digital photographic system 300, and the display image 1010 is displayed on display unit 312. In one embodiment, at least two digital images, such as the at least two related digital images, comprise source images for generating the combined image 1020. The at least two digital images may reside within NV memory 316, volatile memory 318, memory subsystem 362 or any combination thereof. In another embodiment, the UI system 1000 is generated by an adjustment tool executing within a computer system, such as a laptop computer or a desktop computer. The at least two digital images may be transmitted to the computer system or may be generated by an attached camera device. In yet another embodiment, the UI system 1000 may be generated by a cloud-based server computer system, which may download the at least two digital images to a client browser, which may execute combining operations described below. In another embodiment, the UI system 1000 is generated by a cloud-based server computer system, which receives the at least two digital images from a digital photographic system in a mobile device, and which may execute the combining operations described below in conjunction with generating combined image 1020.

The slider control 1030 may be configured to move between two end points corresponding to indication points 1040-A and 1040-C. One or more indication points, such as indication point 1040-B may be positioned between the two end points. Each indication point 1040 may be associated with a specific version of combined image 1020, or a specific combination of the at least two digital images. For example, the indication point 1040-A may be associated with a first digital image generated utilizing a first gain, and the indication point 1040-C may be associated with a second digital image generated utilizing a second gain, where both of the first digital image and the second digital image are generated from a same analog signal of a single captured photographic scene. In one embodiment, when the slider control 1030 is positioned directly over the indication point 1040-A, only the first digital image may be displayed as the combined image 1020 in the display image 1010, and similarly when the slider control 1030 is positioned directly over the indication point 1040-C, only the second digital image may be displayed as the combined image 1020 in the display image 1010.

In one embodiment, indication point 1040-B may be associated with a blending of the first digital image and the second digital image. For example, when the slider control 1030 is positioned at the indication point 1040-B, the combined image 1020 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 1020 or used to generate combined image 1020. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 1030 is positioned at the indication point 1040-A, the first digital image is displayed as the combined image 1020, and when the slider control 1030 is positioned at the indication point 1040-C, the second digital image is displayed as the combined image 1020; furthermore, when slider control 1030 is positioned at indication point 1040-B, a blended image is displayed as the combined image 1020. In such an embodiment, when the slider control 1030 is positioned between the indication point 1040-A and the indication point 1040-C, a mix (e.g. blend) weight may be calculated for the first digital image and the second digital image. For the first digital image, the mix weight may be calculated as having a value of 0.0 when the slider control 1030 is at indication point 1040-C and a value of 1.0 when slider control 1030 is at indication point 1040-A, with a range of mix weight values between 0.0 and 1.0 located between the indication points 1040-C and 1040-A, respectively. Referencing the mix operation instead to the second digital image, the mix weight may be calculated as having a value of 0.0 when the slider control 1030 is at indication point 1040-A and a value of 1.0 when slider control 1030 is at indication point 1040-C, with a range of mix weight values between 0.0 and 1.0 located between the indication points 1040-A and 1040-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 1020 corresponding to an arbitrary position of the slider control 1030. The adjustment tool implementing the UI system 1000 may receive a command to save the combined image 1020 via any technically feasible gesture or technique. For example, the adjustment tool may be configured to save the combined image 1020 when a user gestures within the area occupied by combined image 1020. Alternatively, the adjustment tool may save the combined image 1020 when a user presses, but does not otherwise move the slider control 1030. In another implementation, the adjustment tool may save the combined image 1020 when a user gestures, such as by pressing a UI element (not shown), such as a save button, dedicated to receive a save command.

To this end, a slider control may be used to determine a contribution of two or more digital images to generate a final computed image, such as combined image 1020. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider 1030 to provide mix weight input or color adjustment input from the user.

Figure 11:
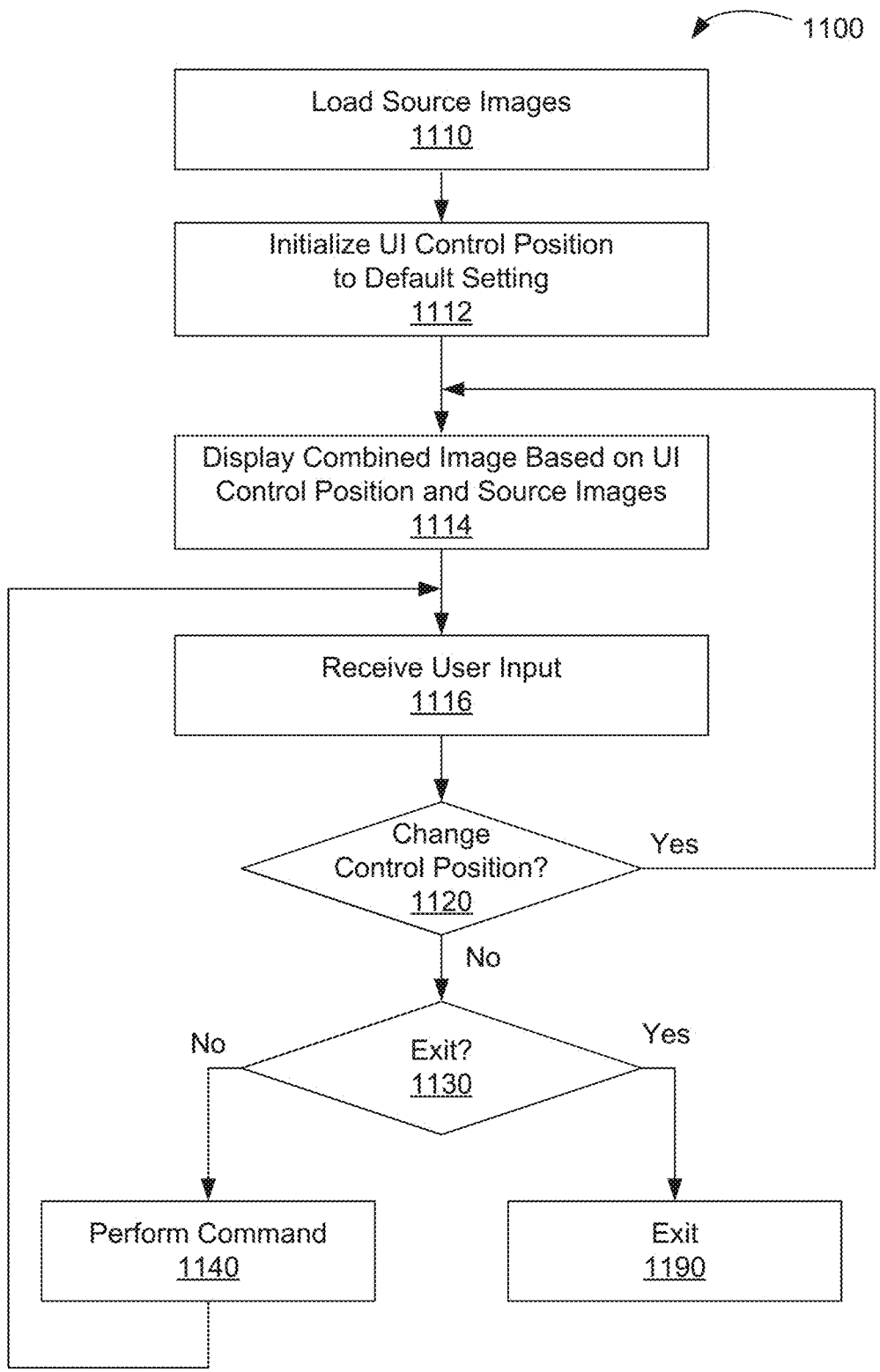
FIG. 11 shows a method for generating a combined image, according to one embodiment.

FIG. 11 shows a method 1100 for generating a combined image, according to one embodiment. As an option, the method 1100 may be implemented in the context of the details of any of the Figures disclosed herein. Of course, however, the method 1100 may be carried out in any desired environment. Further, the aforementioned definitions may equally apply to the description below.

The method 1100 begins in step 1110, where an adjustment tool executing within a processor complex, such as processor complex 310, loads at least two related source images, such as the first digital image and the second digital image described in the context of FIG. 10. In step 1112, the adjustment tool initializes a position for a UI control, such as slider control 1030 of FIG. 10, to a default setting. In one embodiment, the default setting comprises an end point, such as indication point 1040-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1114, the adjustment tool generates and displays a combined image, such as combined image 1020 of FIG. 10, based on a position of the UI control and the at least two related source images. In one embodiment, generating the combined image comprises mixing the at least two related source images as described previously in FIG. 10. In step 1116, the adjustment tool receives user input. The user input may include, without limitation, a UI gesture such as a selection gesture or click gesture within display image 1010. If, in step 1120, the user input should change the position of the UI control, then the adjustment tool changes the position of the UI control and the method proceeds back to step 1114. Otherwise, the method proceeds to step 1130.

If, in step 1130, the user input does not comprise a command to exit, then the method proceeds to step 1140, where the adjustment tool performs a command associated with the user input. In one embodiment, the command comprises a save command and the adjustment tool then saves the combined image, which is generated according to a position of the UI control. The method then proceeds back to step 1116.

Returning to step 1130, if the user input comprises a command to exit, then the method terminates in step 1190, where the adjustment tool exits, thereby terminating execution.

In summary, a technique is disclosed for generating a new digital photograph that beneficially blends a first digital image and a second digital image, where the first digital image and the second digital image are both based on a single analog signal received from an image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the present invention is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image may be performed at varying degrees of quality and visual effect based on availability of a network resource for performing computationally intensive image processing. Furthermore, non-facial object identification may be performed against a database of object identification data that may not readily be stored or timely updated on a mobile device. The disclosed technique advantageously provides server-based identification database scale in settings where network access is not available and where such a database is not suitable for local storage on a mobile device.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a digital radio for communicating with a network resource;
   a processor complex coupled to the digital radio and configured for:
      receiving a request for one or more image operations;
      identifying an availability of the network resource, wherein the availability is dependent on whether the apparatus is able to communicate with a network service system via the digital radio;
      if the network resource is not available, generating a first result using a subset of the one or more image operations; and
      if the network resource is available, receiving a second result using each of the one or more image operations;
      wherein the apparatus is operable such that, if the network resource is not available, the first result generated using a subset of the one or more image operations is a preview of the second result.

2. The apparatus of claim 1, wherein the apparatus is operable such that if the network resource is available at a time after the network resource was not available, the first result generated using the subset of the one or more image operations is replaced with the second result generated using each of the one or more image operations.

3. The apparatus of claim 2, wherein the apparatus is operable such that the first result generated using the subset of the one or more image operations is used as a basis for generating the second result using each of the one or more image operations.

4. The apparatus of claim 1, wherein the apparatus is operable such that the one or more image operations are associated with pixel data.

5. The apparatus of claim 4, wherein the apparatus is operable such that the pixel data is the same data used for generating the first result using the subset of the one or more image operations or for generating the second result using each of the one or more image operations.

6. The apparatus of claim 1, wherein the apparatus is operable such that availability of the network resource is dependent on a network threshold.

7. The apparatus of claim 6, wherein the apparatus is operable such that the network threshold is a bandwidth or a network speed.

8. The apparatus of claim 6, wherein the apparatus is operable such that the network threshold is capable of being set by a user.

9. The apparatus of claim 1, wherein the apparatus is operable such that the one or more image operations include at least one of creating a high dynamic range (HDR) image, applying a blur, or applying a de-hazing procedure.

10. The apparatus of claim 9, wherein the apparatus is operable such that the one or more image operations include creating the high dynamic range (HDR) image, and the apparatus is further operable such that creating the HDR image when the network resource is not available includes applying a subset of functionality of a HDR feature, whereas when the network resource is available, creating the HDR image includes applying at least one of a haze optimization, a contrast optimization, a white balance optimization, an exposure optimization, or a HDR strength optimization.

11. The apparatus of claim 10, wherein the apparatus is operable such that, when the network resource is available, the HDR image is created, in response to user input.

12. The apparatus of claim 10, wherein the apparatus is operable such that at least one sliding indicia is displayed, and when the network resource is available, the HDR image is created, in response to the at least one sliding indicia being manipulated by a user.

13. The apparatus of claim 12, wherein the apparatus is operable such that each sliding indicia of the at least one sliding indicia controls a function of a HDR, including at least one of a sliding indicia for haze, a sliding indicia for contrast, a sliding indicia for white balance, a sliding indicia for exposure, or a sliding indicia for HDR strength.

14. The apparatus of claim 1, wherein the apparatus is operable such that the preview of the second result is stored for a limited time period.

15. The apparatus of claim 1, wherein the apparatus is operable such that, if the network resource is later available, the second result generated using each of the one or more image operations, is used to replace the preview of the second result.

16. The apparatus of claim 1, wherein the apparatus is operable such that, if the network resource is later available, the result generated using each of the one or more image operations, is saved as a separate file from the preview of the second result.

17. A computer program product embodied on a non-transitory computer readable medium, comprising:
  code for communicating with a network resource, by a digital radio;
  code for receiving, by a processor complex coupled to the digital radio, a request for one or more image operations;
  code for identifying, by the processor complex, an availability of the network resource, wherein the availability is dependent on whether the communicating with a network service system via the digital radio is successful;
  code for if the network resource is not available, generating, by the processor complex, a first result using a subset of the one or more image operations; and
  code for if the network resource is available, receiving, by the processor complex, a second result using each of the one or more image operations;
  wherein the computer program product is operable such that, if the network resource is not available, the first result generated using a subset of the one or more image operations is a preview of the second result.

18. A method, comprising:
  communicating with a network resource, by a digital radio;
  receiving, by a processor complex coupled to the digital radio, a request for one or more image operations;
  identifying, by the processor complex, an availability of the network resource, wherein the availability is dependent on whether the communicating with a network service system via the digital radio is successful;
  if the network resource is not available, generating, by the processor complex, a first result using a subset of the one or more image operations; and
  if the network resource is available, receiving, by the processor complex, a second result using each of the one or more image operations;
  wherein if the network resource is not available, the first result generated using a subset of the one or more image operations is a preview of the second result.

* * * * *